United States Patent [19]

Cappelaere et al.

[11] Patent Number: 5,428,525
[45] Date of Patent: Jun. 27, 1995

[54] COMPUTER SYSTEM AND METHOD FOR SIGNAL CONTROL PRIORITIZING AND SCHEDULING

[76] Inventors: Patrice G. Cappelaere, 8303 Winter Wind Ct., Ellicott City, Md. 21046; James Van Gaasbeck, 430 Riverview La., Melbourne, Fla. 32951; Brian Buckley, 2216 Hamlet Dr., West Melbourne, Fla. 32934

[21] Appl. No.: 907,186

[22] Filed: Jul. 1, 1992

[51] Int. Cl.⁶ ............................................. G05B 11/01
[52] U.S. Cl. .................................... 364/140; 364/148; 395/50; 395/906
[58] Field of Search ............... 364/148, 140, 162, 150, 364/550; 395/900–918, 50, 62, 61, 11, 53, 63, 81, 84, 88, 94, 22, 77, 68

[56] References Cited

U.S. PATENT DOCUMENTS

| | | | |
|---|---|---|---|
| 4,740,886 | 4/1988 | Tanifuji et al. | 364/150 |
| 4,877,940 | 10/1989 | Banss et al. | 395/904 |
| 5,006,992 | 4/1991 | Skeirik | 364/148 |
| 5,032,525 | 7/1991 | Lee et al. | 364/162 |
| 5,058,043 | 10/1991 | Skeirik | 364/550 |
| 5,185,849 | 2/1993 | Miyazawa et al. | 395/3 |
| 5,195,029 | 3/1993 | Murni et al. | 395/904 |
| 5,216,218 | 6/1993 | Sasaki | 395/904 |
| 5,295,231 | 3/1994 | Ogino | 395/77 |
| 5,303,385 | 4/1994 | Hattori et al. | 395/22 |
| 5,305,230 | 4/1994 | Matsumoto et al. | 395/914 |

*Primary Examiner*—James P. Trammell
*Attorney, Agent, or Firm*—Morton J. Rosenberg; David I. Klein

[57] ABSTRACT

This invention provides a computer operated process control system and method for controlling an external process control system using a combined rule-based expert system in combination with a procedural control system. The computer operated process control system includes a first storage mechanism (18) which includes both the expert rule data on agenda (54) and scripts (52) which are procedurally based. Input data from the external process control system is as acquired in an acquisition system (46) where it is acquired and reduced and then inserted into a second storage system (20) where such as processed and where significant variances in data input are when output to a real time engine (100). An inference engine (16) accepts rules from the agenda (54) and outputs a second command signal to an interpreter (14) based upon the varying data and the appropriate commands from rules on agenda (54). Simultaneously, data is inserted from the script list (52) to a scheduler (12) which provides a first command signal to the interpreter (14). Based upon a prioritizing schedule, output signals are passed to an input/output formatter (24) where commands are sent to the external process system. In this manner an expert system is merged with a procedural language system and provides increased efficiency as well as capability to control external process systems.

24 Claims, 8 Drawing Sheets

| | | |
|---|---|---|
| HIGHEST | ( ) | PARENTHESES |
| | NOT | LOGICAL NOT FUNCTION |
| | − | ARITHMETIC NEGATION |
| | ** | EXPONENTIATION |
| | * / | MULTIPLICATION |
| | + − | ADDITIVE |
| | < > <= >= | INEQUALITY |
| | = ≠ | ASSIGNMENT/INEQUALITY |
| | AND | LOGICAL AND |
| | OR | LOGICAL OR |
| LOWEST | XOR | LOGICAL XOR |

FIG. 9

COMPUTER SYSTEM AND METHOD FOR SIGNAL CONTROL PRIORITIZING AND SCHEDULING

FIELD OF THE INVENTION

This invention directs itself to methods and systems of operating computers for control of external process control systems. In particular, this invention directs itself to a method and system of controlling an external process control system through use of combined procedural based commands and an expert system based rules and commands. More in particular, this invention directs itself to a method and system of operating a computer which provides for the capability of command interpretation and then provides for asynchronous event handling in a combined manner. Further, this invention directs itself to a method and system of operating a computer for control of an external process system whereby a first storage mechanism stores the expert system and the procedural system which are then inserted into a real time engine for prioritizing and issuing commands to the external process control system.

PRIOR ART

Computer operated process control systems and methods of operation are known in the art. However, for many applications such as spacecraft control systems, such have been designed to support repetitive commanding for mission tasking. Due to wait consideration on-board commanding languages have been previously limited in the prior art. Data such as telemetry variables could not be checked, and subroutines were not allowed to have parameters and flow control was generally primitive. Such prior art systems did not provide for real time execution and updating based upon changes in external process control systems data parameter changes. Further, prior art systems did not allow for the inclusion of a prioritizing scheme to allow for scheduled script procedural data to be inserted in combination with an expert rule based system dependent upon changes in data.

SUMMARY OF THE INVENTION

The computer operated process control system and method includes a method of operating a computer system for producing process control signals to control the external process control system and includes the steps of initially providing a first storage system for storing pre-stored control parameters or predefined instruction sequences or scripts and predetermined process variables defining a plurality of process variables or conditional evaluations and subsequent actions or rules. A second storage system is provided for receiving stored process input parameters from the external process control system. A command processor accepts user input command signals and outputs processor control signals. Pre-stored control parameters or scripts are concurrently processed to provide a first command signal with predetermined process variables or rules in a predetermined manner to provide a second command signal. Execution of the first and second command signal produces output control signals for control of the external process control system.

DESCRIPTION OF THE PREFERRED EMBODIMENTS

Figure 1:
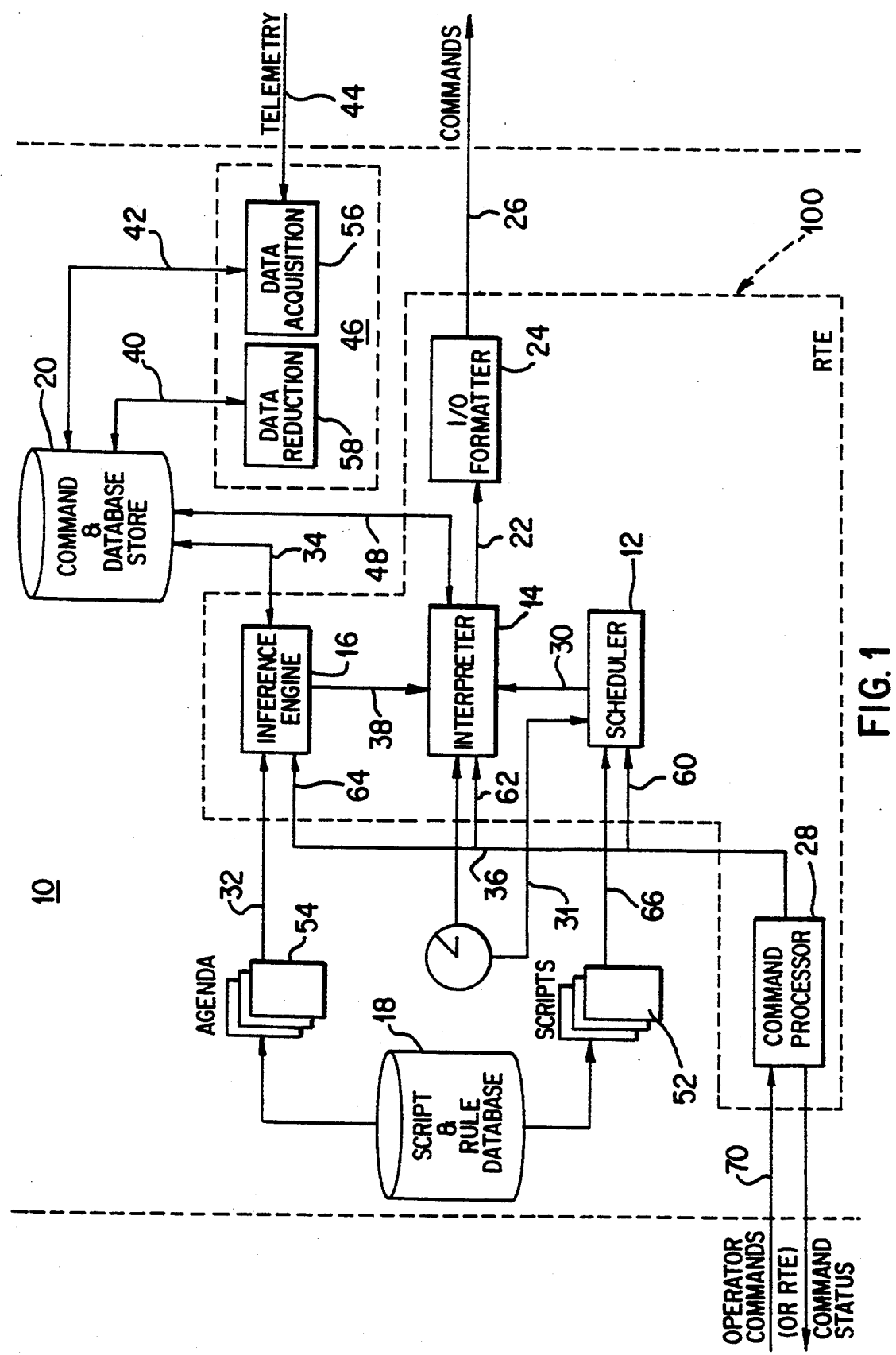
FIG. 1 is a block diagram showing the computer operated process control system.

Referring now to FIG. 1, there is shown the overall block diagram for a system and method of operating a computer system for producing process control signals to control an external process control system (not shown). The overall system accepts specified input signals from the external process control system on line 44 which may be through telemetry or other modes not important to the inventive concept as herein described, Additionally, output control signals are sent to the external process control system on line 26 for initiating and controlling various processes on the external process control system responsive to operator commands and input signals from the external process control system.

In particular, the overall system includes concurrent processing of pre-stored control parameters or command and/or instruction sequences in the form of scripts and asynchronous execution of predetermined process variable parameters in the form of rules to provide control signals responsive to input signals or operator signal input on line 26. In this manner, based upon the input of a particular external process control system, instructions may be executed immediately or delayed in accordance with prioritizing rules and multiprocessing of scripts.

In particular, the system as herein defined provides for the process control system 10 as shown in FIG. 1 includes real time engine 100 provided for accepting input data as will be described in following paragraphs and allowing prioritization and execution of such data for passage on output line 26. Real time engine 100 has as its basic components scheduler 12, interpreter 14 and inference engine 16 to be described in following paragraphs. First storage system 18 is provided to store scripts defining a plurality of sequential command or instruction data 52 as well as predetermined process variables or rules defining a plurality of conditional commands to be processed within real time engine 10. The plurality of instruction data scripts 52 are generally instructional data which is pre-stored and are to be executed upon external command or rule execution. The predetermined process variable rules defining the process variable rules 54 are interactive process variable rules which are actuated responsive to variances or changes in instruction data being passed to real time engine 10 from input line 44 to be described in following paragraphs.

Second storage system 20 receives and stores specified input parameters from the external process control system. Telemetry or other data input is provided on line 44 to acquisition system 46 and acquired in data acquisition module 56. The telemetry or other data acquired in standard data acquisition module 56 is compared with existing data from second storage system 20 on line 42 and data reduction is provided in data reduction module 58 which is then inserted into second storage system 20 on line 40. In overall concept, second storage system 20 provides for a mechanism whereby specified input parameters are reviewed and significant changes to specified input parameters are calculated and inserted. Data is then passed to inference engine 16 on line 34.

Again, in overall concept, second storage system 20 or command and database storage system allows a plurality of signals to be operated upon and used by real time engine 10 for concurrent processing of scripts, rules, and operator commands through interpreter 14 and output of commands on line 22 for insert into the I/O format system 24 for producing command signals on line 26 to the external system whose processes are being con, rolled.

The three main system modules of real time engine 10 are scheduler 12, interpreter 14 and inference engine 16. Scheduling system 12 is coupled to command processor 28 for receiving signals therefrom on line 60 transferred from line 36. Output of scheduler 12 is provided on line 30 for generation of a next command signal based on time and priority and further responsive to command processor signals input on line 60 to control execution of operation such as START, STOP, etc.

As has been stated, scripts 52 are stored in first storage system 18 and are chosen or executed through scheduler 12 upon external or internal request on lines 60, or 66 or time on line 31. Scheduler 12 passes through a predetermined number of scripts 52 maintained in first storage system 18 and prioritizes active scripts 52 for analysis of the priority rating of such scripts and time of execution and outputs a responsive first control signal on line 30. Input to scheduler 12 is established through lines 66 from first storage system 18 and line 60 from command processor 28 which may provide various types of override commands to scheduler 12 as necessitated by an external operator.

Inference engine 16 is coupled to both first storage system 18 and second storage system 20 through respective lines 32 and 34. Predetermined process variable rules are maintained in first storage system 18 and are evaluated by inference engine or comparison system 16. Further, data from second storage system 20 are passed through comparison system 16 and generally, input is made to comparison system 16 when significant changes are found in data passing on line 44 and inserted into second storage system 20 on line 40. The input data being transferred from data acquisition system 56 to second storage system 20 on line 42, and then to data reduction module 58 on line 40 for further processing and reformatting, the reduced data being inserted back to second storage system 20 on line 40. The resulting output of inference or comparison system 16 provides second control signals to interpreter 14 by line 38. In this manner, provision and capability is made for changing output process control signals responsive to predetermined rules 54 maintained in first, storage system 18 which are triggered from any significant changes input to inference engine 16. Command processor 28 is coupled to comparison system 16 through input lines 36 and 64 to provide override or other types of operator commands, or loads (scripts, rules, database). Commands are inserted to command processor 28 on line 70 from an external input and provide for third command signals passing on line 36 to inference engine 16, interpreter 14 and scheduler 12 on respective line inputs 64, 62 and 60.

In overall concept, particular output command signals passing on line 22 from interpreter system 14 are derived from first and second signals inserted into interpreter 14 on lines 30 and 38 from scheduler system 12 and inference engine 16 respectively. Interpretation system 14 interprets the first control signals passing on line 30, second control signals passing on line 38 from comparison system 16 and third control signals passing on line 62 from command processor 28 in a substantially concurrent manner for producing output, command signals on line 22 passing to I/O format system 24 resulting in the commands being sent on output line 26 to the external process control system.

Particularly, specified input parameters are inserted into second storage system 20 asynchronously through lines 40 and 42 of acquisition system 46. Where significant changes in specified input parameters are found, such changes are passed to comparison mechanism 16 on line 34 and such changes are stored in a predetermined portion or section of second storage system 20 which is interrogated by inference or comparison system 16 to determine and specify which input parameter changes require responsive action, and according to what priority such action is to be taken.

Responsive to this determination, inference or comparison system 16 then interrogates the agendas 54 to determine which rule is acceptable and useful for processing responsive to the changes in the specified input parameters.

Subsequent to the pulling of the predetermined process variable rules from first storage system 18, interpreter 14 then accesses the highest priority process variable rule and compares it with the highest priority pre-stored script from schedule list 52 which are being processed by scheduler 12. When the priority of the predetermined process variable rule exceeds that of a control script derived from list 52 then the conditional statements of the rule is evaluated against data in second memory system 20 and appropriate commands are executed in interpreter 14. Command signals may be generated on line 22 to the external process control system being controlled by the overall process control system 10, concurrently with the current control script selected for execution by scheduler 12. Subsequent to higher priority rule derived second control signals being executed, execution of control statements or commands from scripts 52 is resumed by scheduler 12 through interpreter 14.

Figure 2:
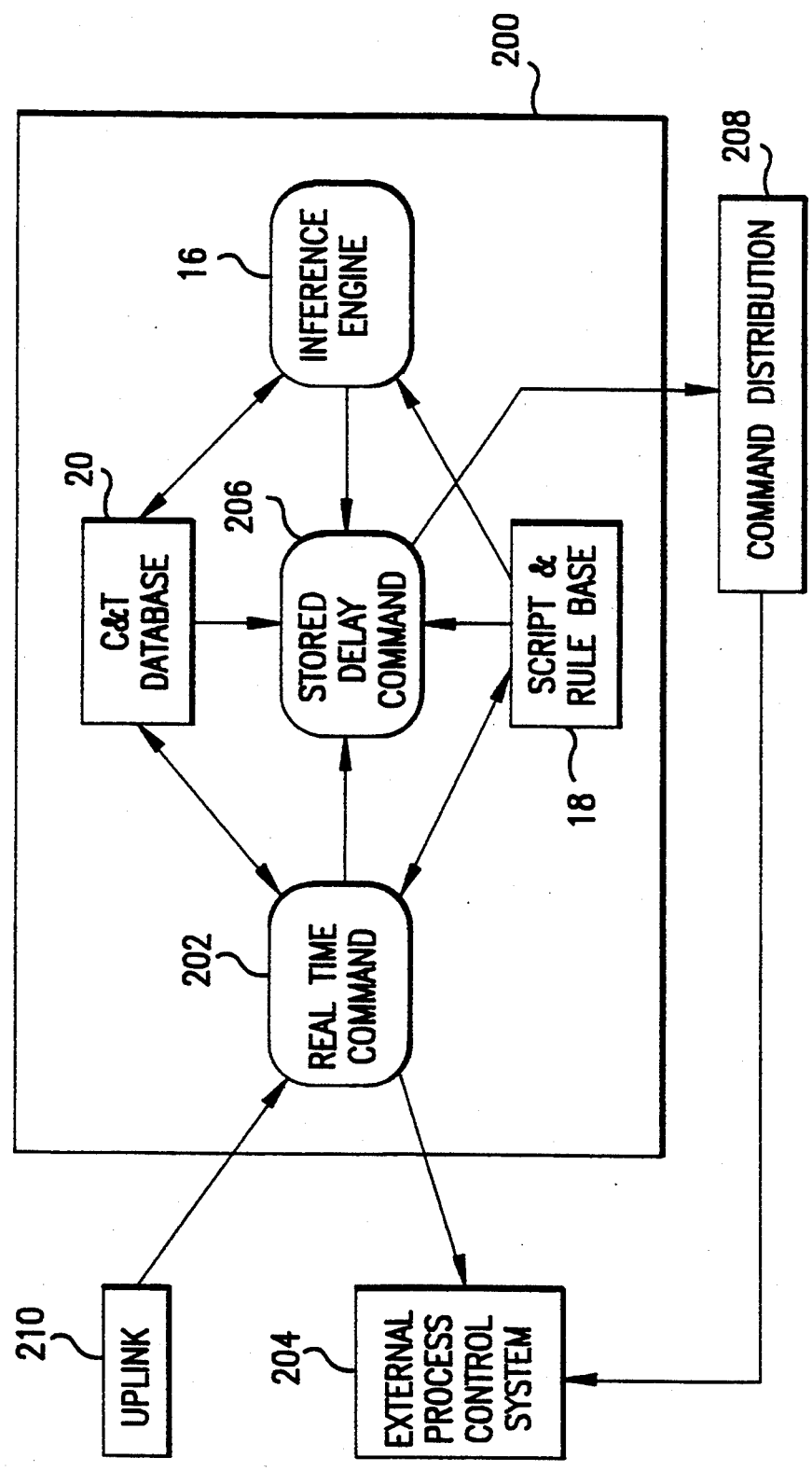
FIG. 2 is a block diagram showing the architecture for the command interpreter system.

Referring now to FIG. 2, there is shown a further interaction block diagram as an exemplary application of process control system 10 showing a command interpreter (CINT) which is for support of all commanding services provided by process computer control system 10. CINT 200 encompasses all real time commands, all commands from delayed and stored command scripts 52 and all event driven commands found in rules 54. In addition to processing commands, CINT 200 provides a complement for logic processing and diagnostics based on a particular language being used. Such capabilities include the processing of procedural scripts 52 and event driven or predetermined process variable rule agendas 54. CINT 200 supports commands and command data that are to be executed immediately upon receipt in real time command block 202 and are known as real time commands. CINT 200 further supports commands and command data stored in external control system 204 for execution at some predetermined time. Still further, CINT 200 supports actions such as commands and command data that are executed as a result of predefined events known as event driven commands obtained from rules 54 and changes in specified data from the external process control system.

Real time command block 202 supports commands and command data that are executed as soon as they are received. CINT 200 includes the real time scheduler 202 and interpreter command 206 interfacing with inference engine 16 and first storage system 18 as well as second storage system 20. Output from real time command 202 can pass to command I/O formatter 208 for disbursement to appropriate process control sections for controlled signal distribution. Real time commands may arrive from external sources or from some other external system and real time command 202 routes internal commands to external process system 204. External commands are routed from real time command 202 to command distribution 208 for distribution to the appropriate user of such commands within the overall system. Real time command 202 loads, installs and dumps data objects into script and rule base or first storage system 18 and acts on command to delete items or data from first storage means 18. Where a request is made to execute a particular script 52 immediately, then interpreter 206 is notified to retrieve the location of the particular script 52 in first storage system 18. Real time command 202 further loads, deletes, dumps and modifies items in second storage system 20 based on appropriate commands being received. Finally, real time command 202 executes commands such as "START", "HALT", "PAUSE" as well as "SET" and "SHOW" for the strategy, tuning and schedule parameters.

Numerous control commands are used for real time engine 10 and include control commands to be described in following paragraphs, "START" is a command when issued with no parameters causes the real time engine 10 to start some or all of its functions. The command parameters may specify whether or not to start the command interpreter 14 which processes stored/delayed command scripts or inference engine 16 which processes rules and events or telemetry monitoring from line 44 which handles all incoming data. Initializing command interpreter 14 enables scheduling and executing of stored command scripts, enables rule processing and event handling, and places real time engine 100 in an active state. Starting command interpreter 14 and not initializing and starting inference engine 16 does not enable rule processing and event handling from scripts 54 but allows scheduled/executing scripts 52 to continue. Initializing and starting the data acquisition system 46 enables reduction processing of input data being obtained on line 44.

"STOP" is a command which causes the real time engine 10 to stop some or all of its processing. This command may specify parameters to select whether or not to stop command interpreter 14 which is processing stored/delayed command scripts 52, inference engine 16 which is processing rules and events from agenda 54 and telemetry monitoring which is handling incoming telemetry messages or data on line 44 from the external process control system. Terminating interpreter 14 disposes of all schedules/executing scripts 52, disables rule processing and event handling on agendas 54 and removes the event queue.

"PAUSE" is a command which causes the real time engine 16 to pause for some or all of its processing. When issued with no further parameters, all functions of the real time engine 10 are paused however, command parameters may be used to specify which of particular functions are to pause, such as interpreter 14, inference engine 16, or telemetry monitoring module 46.

"RESUME" is a command which causes the real time engine 10 to begin some or all of its functions and may specify which functions are to be resumed and to be initialized, such as the interpreter 14, inference engine 16, or telemetry monitoring module 46.

"INITIALIZE" is a command causing a cold start of some or all functions in a predetermined manner.

A number of real time engine internal commands are provided to control the operation of the real time engine 100 exemplified by numeral 200 in FIG. 2. Such internal commands include "EXECUTE <script name>" which causes the real time engine 10 to schedule specified scripts 52 based upon a particular execution type. The execution types recognized are "IMMEDIATE" which causes the specified script 52 to be entered into the executing state in an immediate fashion. Another type of execution is a timed execution which allows for a specified script 52 to be scheduled for execution at some predetermined time and a "DELTA" command causes a specified script 52 to be scheduled for execution in a specified time interval from the time that the command is received. A "CYCLIC" command causes the specified script 52 to be scheduled for execution cyclically at a specified time interval.

Other commands exist such as "STOP <script name>" which causes the real time engine 10 to stop currently executing script 52 or to remove a specified script 52 from the execution queue schedule. With this command, the currently executing command is completed and the execution of the specified script 52 is terminated. Other commands include "UPDATE DATABASE ENTRY FIELD" to allow the real time engine 100 to update the specified field of a specified database entry. Inference engine or comparison system 16 commands include "ACTIVATE/DEACTIVATE <rules name>" which are commands to inference engine 16 which controls its processing of rules from agenda 54. An "ACTIVATE" or "DEACTIVATE" of a specified rule or category of rules causes inference engine 16 to include or remove a specified rule or rules from the list of rules. Additionally, "EVALUATE <rule name>" is a command which causes inference engine 16 to evaluate a specified rule from agenda 54. External commands allow for execution by subsystems external to the process control system. Additionally, "PRECISION" commands are provided which have a time and timer identification associated with such commands. Pertinent timer and time data is then passed to command distribution 208 shown in FIG. 2 for setting an appropriate timer.

Figure 3:
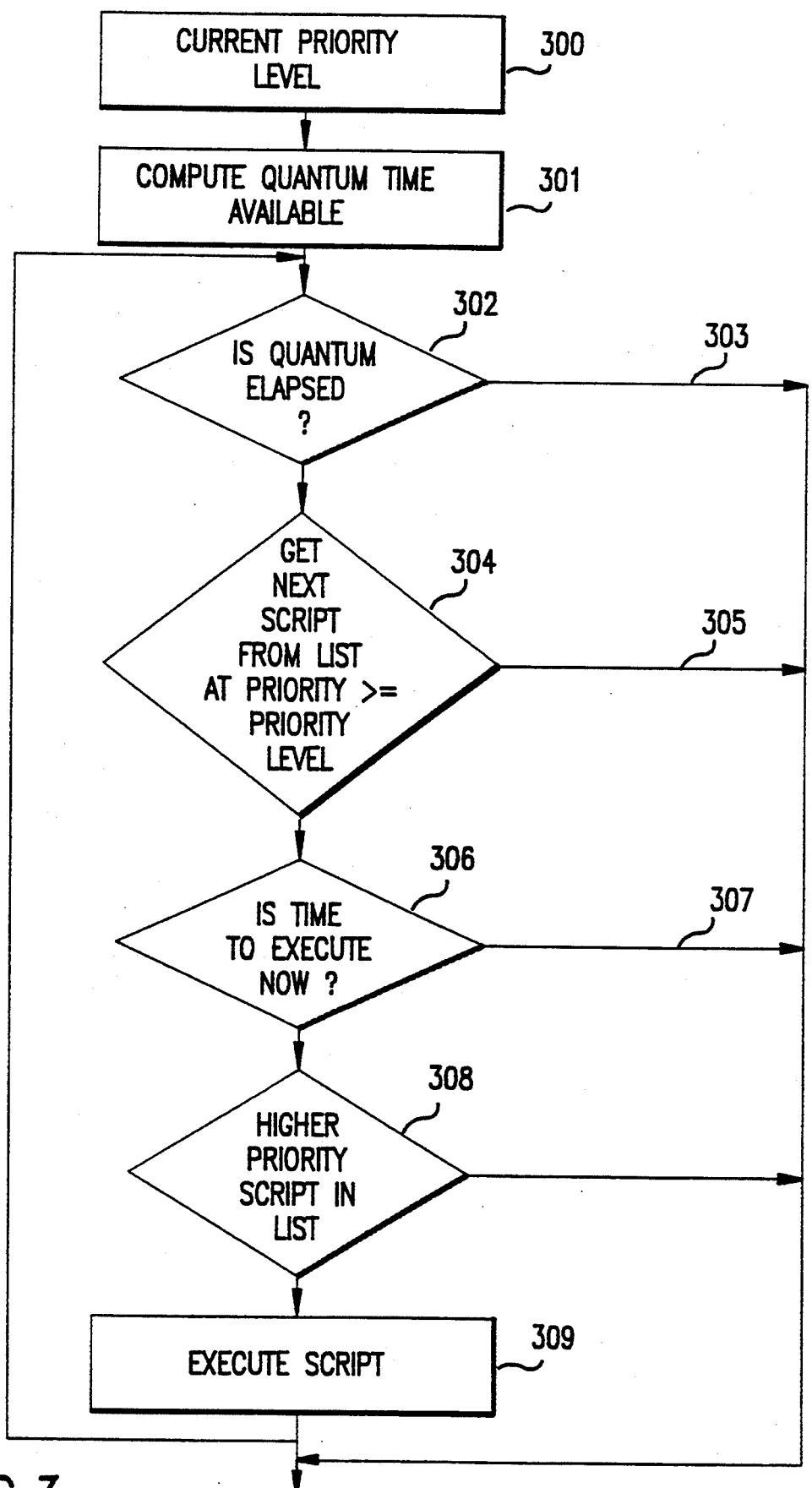
FIG. 3 is a flow diagram showing logic flow through the scheduler.

Referring now to FIG. 3, there is shown the logic blocks associated with scheduler 12 for determining appropriate command signals to be sent. The context priority level is set for the duration of the processing in block 300 as a passed parameter. A quantum of time is then calculated for script processing in block 301. The quantum of time is merely a constant multiplied by the priority number of the script. The constant may be chosen at the users discretion. Processing is constrained to occur within that period of time in block 302. The scheduler 12 remains in a loop for the duration of the quantum. Flow passes to block 304 which allows the scheduler 12 to fetch the next script from list 52 that is in a currently active state and where priority is greater or equal to the context priority level. Its execution time is determined in block 306. Prior to execution of that script, a check is made through list 52 in order to determine a possible presence of a higher priority script in block 308. Where no script of higher priority is there is execution of the script in 309.

Figure 4:
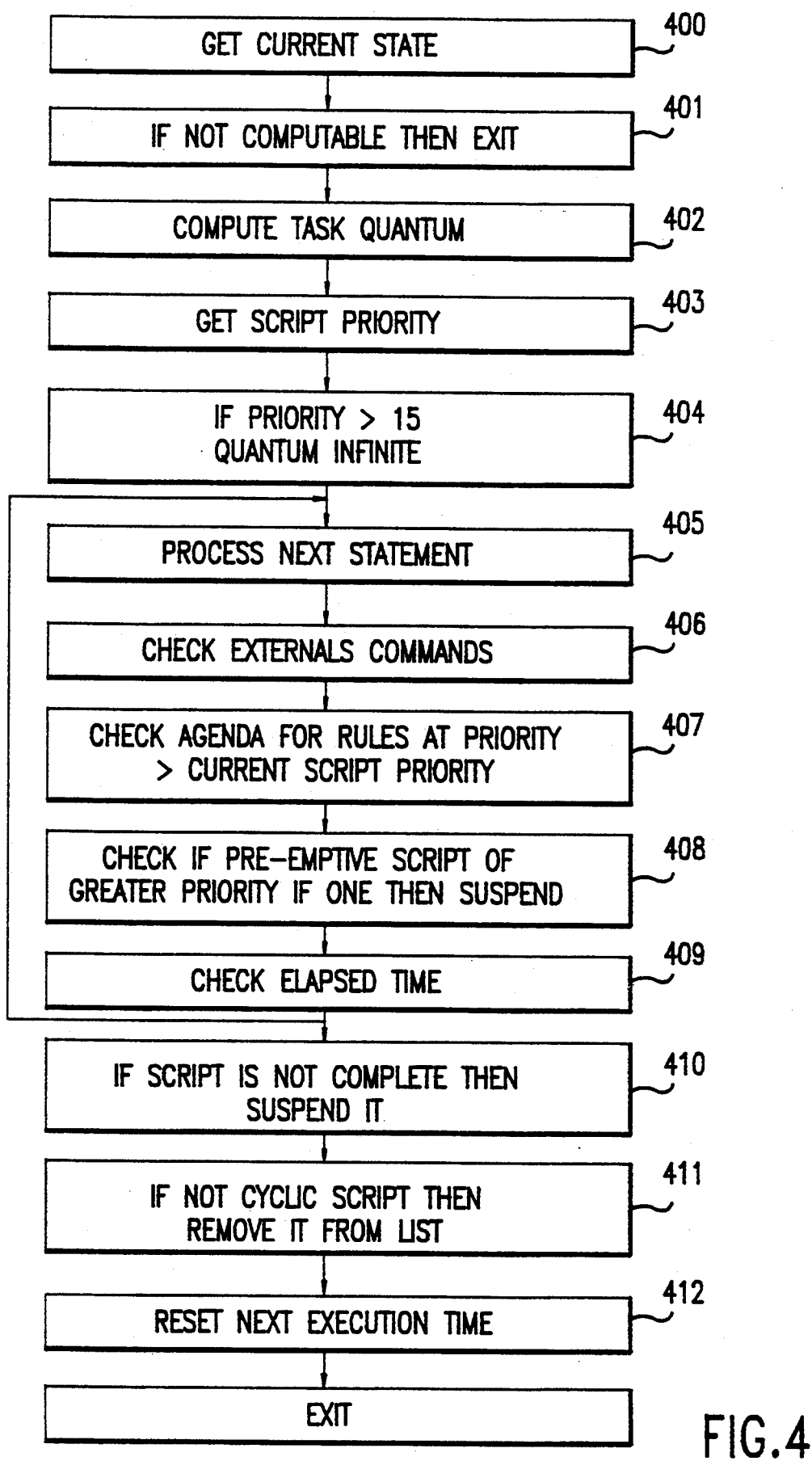
FIG. 4 is a flow diagram showing the processing and execution of scripts within the overall computer control system.

Execution of the scripts is shown in FIG. 4 where scheduler 12 begins execution of a script by obtaining the current state as shown in block 400. A script may be SUSPENDED, WAITING, COMPUTABLE, or have other states. If the script is computable as determined in block 401, a quantum of time is calculated for processing the commands or instruction data embodied in the script.

A quantum time is allocated to a script as a function of its priority value where the task quantum is calculated in block 402, the script priority 18 obtained in block 403. For a particular script, the higher a priority value, the longer the quantum time granted to a script. For a particular script, as many commands as possible for a quantum time are executed if no higher priority script or rule has to be executed.

If a current script has a priority value of fifteen or greater as determined in block 404 the script is given the designation of being preemptive meaning that it will be executed until the end or until a script of higher priority preempts it, Otherwise, processing will occur only for the duration of the quantum.

Scripts, commands or instruction data are processed in block 405 one at a time, in a loop for the duration of the quantum, unless preempted. External commands are checked in block 406 to determine if there are external commands inserted on line 60 received from command processor 28 and such are executed if received. Subsequently, determination is made on whether any rules on agenda 54 which have been made active by a change in input data from data reduction 58 have a higher priority value rating than the current script being processed as shown in block 407. If any rules on agenda 54 being processed by inference engine 16 do have a higher priority rating, then the overall system returns to process the higher priority rules of agenda 54 found within first storage or first memory system 18.

If there are no rules on the agenda 54 with a higher priority than the current script, verification is made in the list of scripts 52 for the presence of a preemptive script and then a determination is made whether the total script processing time has been completed as provided in blocks 408 and 409.

If all instructions in the current script have been processed then the script is removed from the list 52 unless the script is cyclic as shown in blocks 410 and 411. Where the script is cyclic, its next execution time is calculated and the script is left on the schedule list 52. If the script is not completed, the script is placed in a suspended state for continuation of the execution of the next iteration. Reset of the next execution time is provided in block 412.

Figure 5:
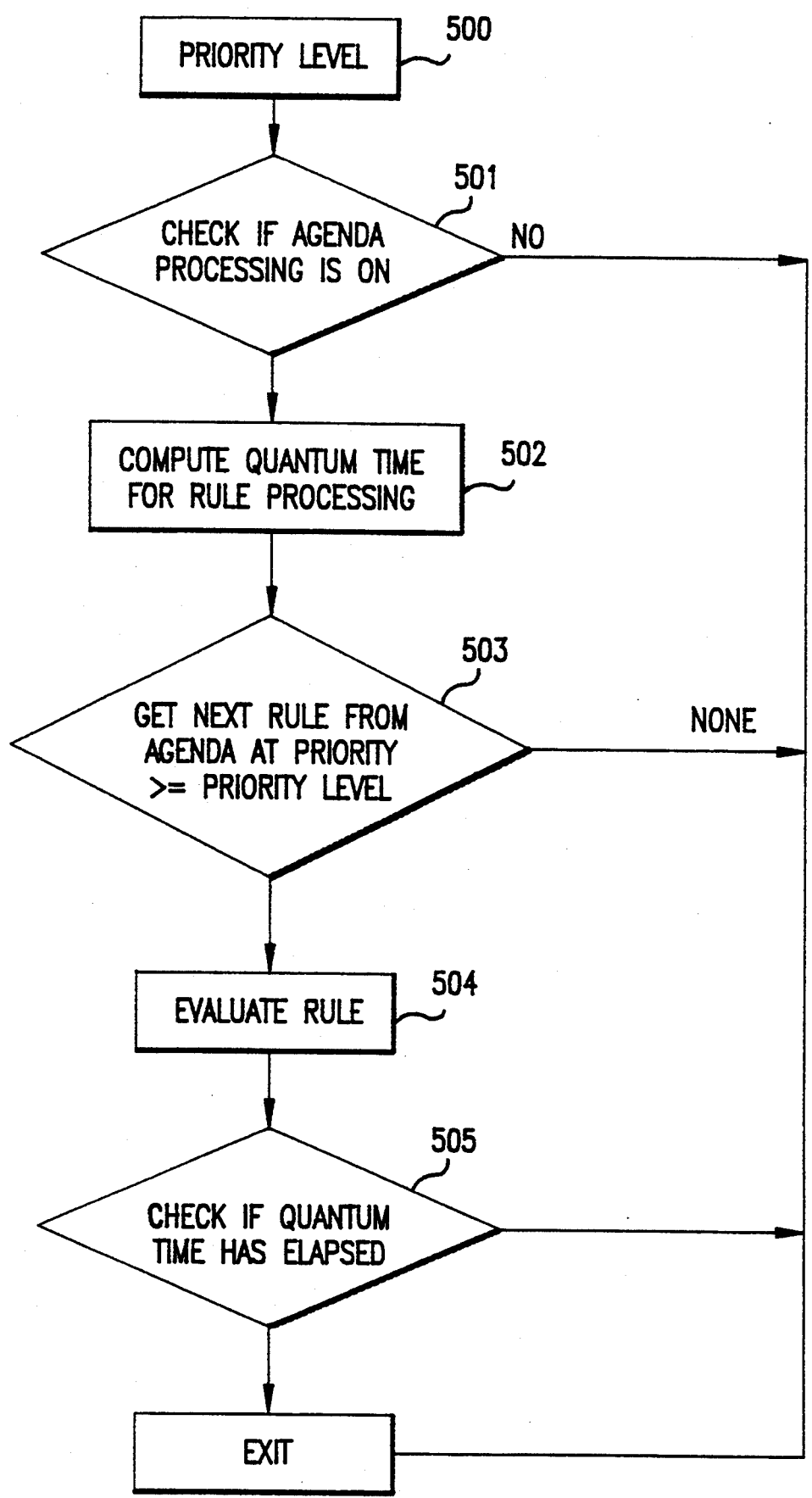
FIG. 5 is a flow diagram showing the processing of rules based upon the agenda in the process control system.

Referring to FIG. 5, there is shown the logic flow within real time engine 100 for processing rules on specified agenda 54 found in first storage system 18 by inference engine 16, If rule processing is enabled in block 501, the processing is done for a particular priority level known as context priority, determined in block 500, A quantum of time is then calculated for rule processing. Rules will be processed until that quantum expires. The highest priority rule whose priority is also higher than the context priority is fetched form the agenda as defined in FIG. 7. That process is repeated until the quantum expires, as shown in block 505.

Figure 6:
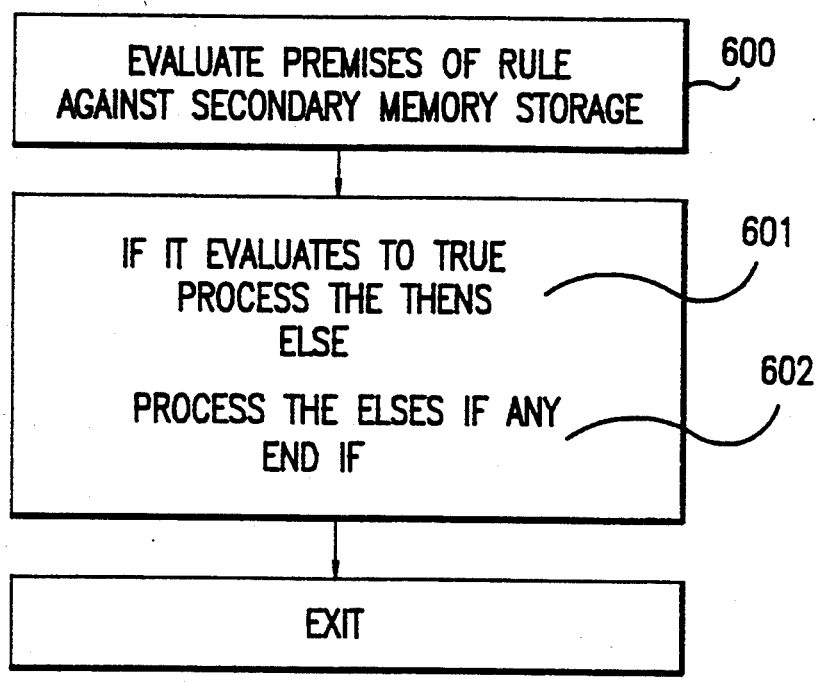
FIG. 6 is a block flow diagram showing evaluation of rules.

Rules are being evaluated as defined in FIG. 6. The premises of the rules are computed and compared against the stored values from second storage area 20 updated from the input data after reduction from the data reduction process 58. If the evaluation succeeds then the instructions defined in the right hand side of the rules will then be interpreted by the command interpreter 14. If the evaluation does not succeed, alternate instruction sequences if defined will be processed. Processing of the instruction sequences are defined in FIG, 7.

Instruction sequences or command sequences are processed by the interpreter 14 in a very similar fashion as the script sequences as defined in FIG. 4. Instructions are fetched sequentially and processed one at a time. After the processing of each statement, the interpreter checks for incoming external commands 60 generated from the command processor upon reception of an external command or operator input. The agenda is then checked for presence of higher priority rules until complete processing.

Figure 7:
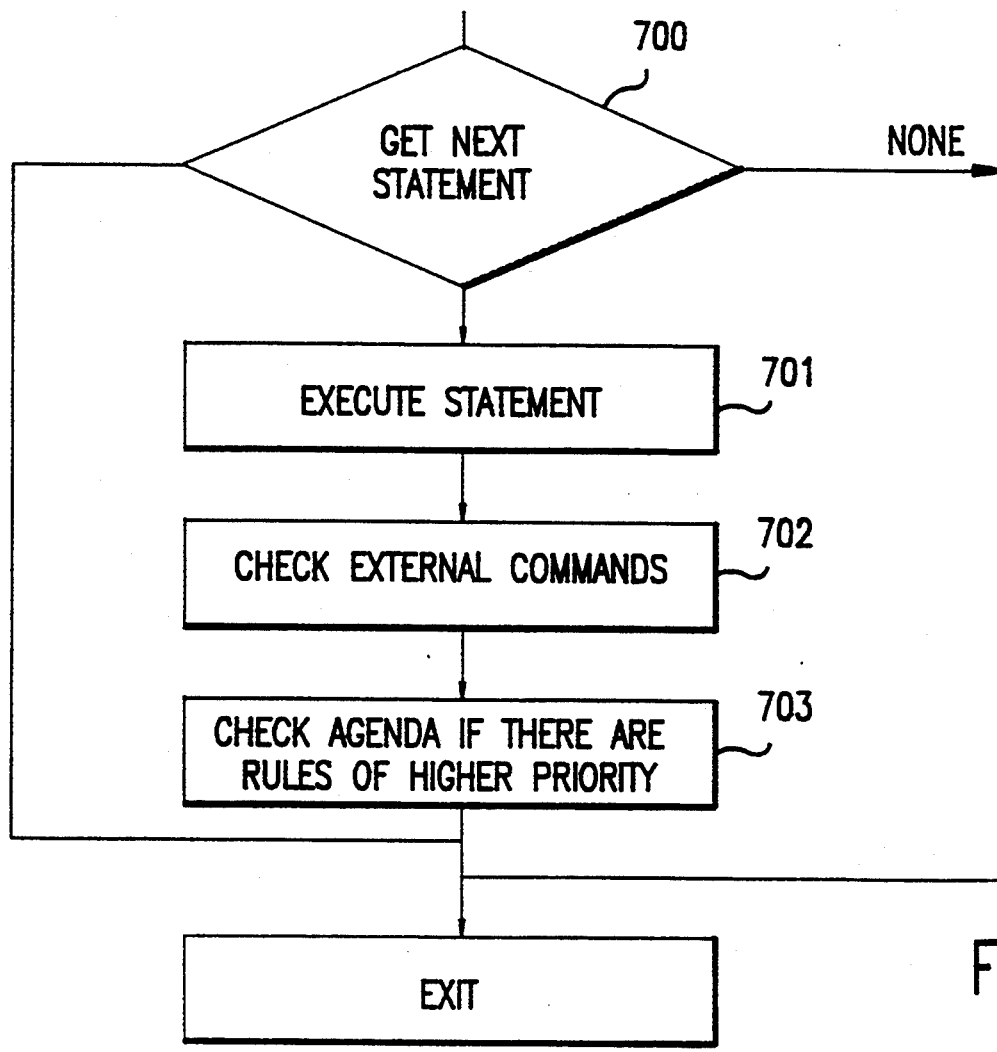
FIG. 7 is a logic flow block diagram showing rule processing.

Referring to FIG. 6, there is shown a block flow diagram for evaluation of Rules where the premises of a rule is evaluated against second memory storage in system 20. If the rule evaluates to "true" in block 601, the "then" is processed and the "else" is processed in block 602. FIG. 7 is a flow block diagram for processing of "Thens" or "Elses" as provided in blocks 601, 602. In block 700 the next statement is obtained and executed in block 701. External commands are checked in block 702 and the agenda is checked in block 703 to see if there are any rules of higher priority.

In order to achieve a maximizing efficiency and compactness for commands to be sent to the external process system being controlled, a computer language structure has been designed which provides a real time environment used to command, control and monitor subsystems external to process control system 10. The language structure has been designed to be a general purpose language and is a fifth generation language based on hybrid technology which uses aspects of expert system technology, event driven processing, procedural processing and multi-tasking operation systems. As has previously been described, usage of the language allows the user to define scripts and rules where scripts are procedural such that statements execute sequentially in a deterministic manner. Scripts on the schedule list 52 executing in a background mode may be handled by the real time engine 100 to perform cyclic operations such as telemetry dumps in view of a ground station, or memory scrubbing or other cyclic type operations not important to the inventive concept as herein defined. The user may also define rules to perform a monitoring and control function by handling asynchronous events such as possibly telemetry item changes provided by the external process system being controlled. Obviously, as is well known in the art, rules on agenda 54 differ from scripts 52 in that the rules on agenda 54 are non-deterministic and evaluation of the rules on agenda 54 are dependent on specific event happenings.

Scripts are essentially lists of commands or instruction sequences however such may have enhanced capabilities wherein constructs taken from a high order language are available including bit-field manipulation, flow control and nested subroutine calls. Scripts may also reference input parameters stored in second storage area 20 such as telemetry variables in various expressions as well as set the value of derived input data items from the external system being controlled. Such enhancements allow the user the ability to check various responses within a script and alter the script's flow if such is deemed necessary. Scripts may be executed immediately or may be scheduled for some delayed execution in a background mode. Scripts when put into the background mode may be in the form of an absolute time, a relative time, or on some type of cyclic basis. Additionally, scripts can be used as building blocks for enhanced command systems. As an example, parameters may be passed to scripts and low-level scripts may implement a higher level of commanding such as a command to configure a system to use the redundant side of a subsystem.

Rules on agenda 54 are generally used to monitor and control events. Rule execution on agenda 54 is in an asynchronous nature. In general, a rule is executed only when some specific event happens. Further, the event is database driven and the user specifies a condition explicitly within an "if" statement. Such a condition may involve multiple database items if such is necessary and when a database item changes, each rule associated with that item is retrieved and the "if" condition is evaluated to determine whether the conditions of the rule have been met. If the conditions of the rule have been met the statements following the "then" are executed. Still further, as used in the overall process control system 10, the inference engine 16 may evaluate constraints upon control signals generated by the interpreter 14 to determine whether the command is consistent with the existing configuration. Action of a constraint is executed in advance to prevent improper control signals from being generated accidentally or generation of control signals at inopportune times. Therefore, a constraint can reject the action thus not executing such under existing conditions.

Figure 8:
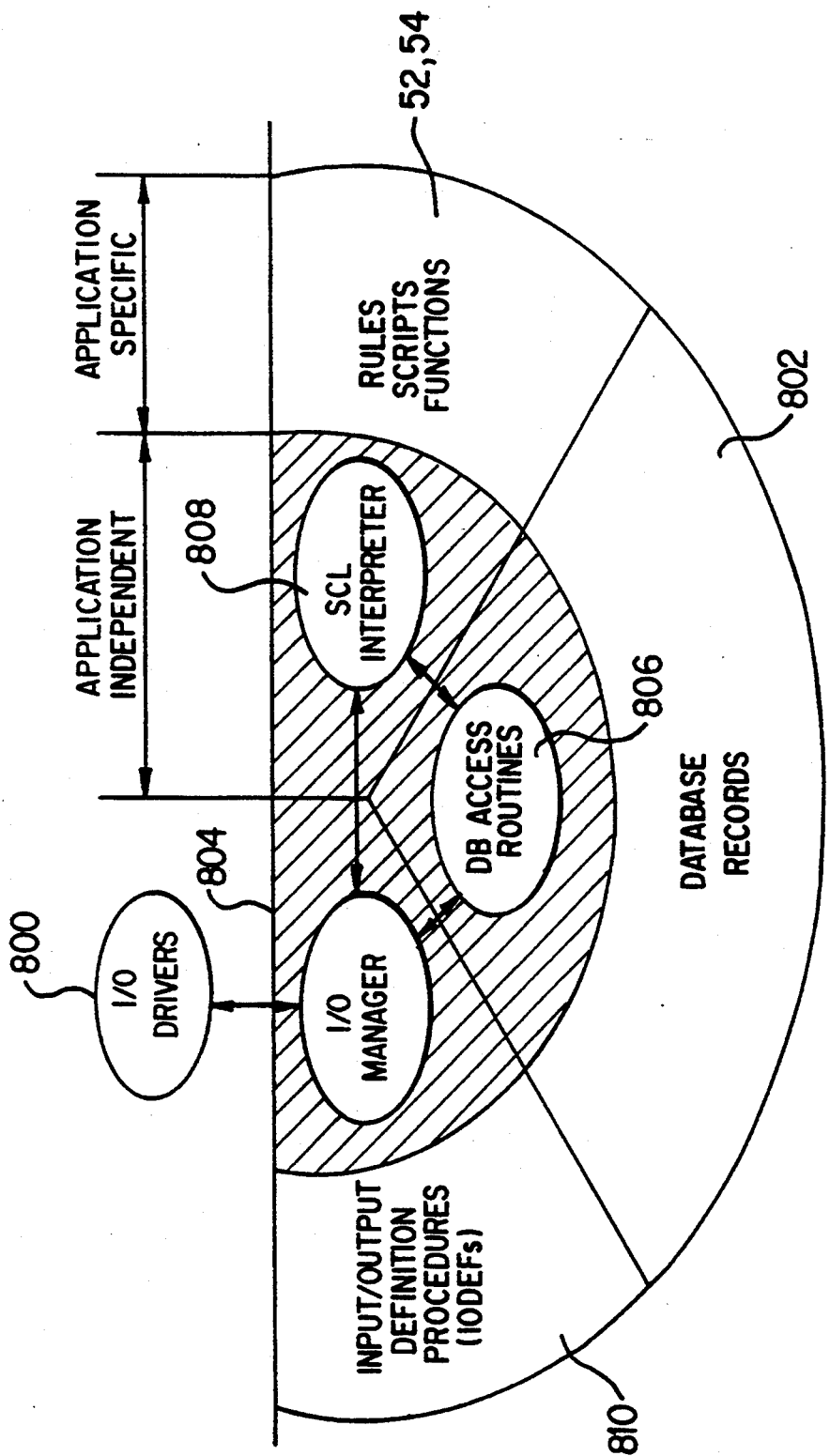
FIG. 8 is a schematic type drawing showing the kernel architecture for the executable computer language; and, FIG. 9 is the computer language operator precedence chart.

The real time kernel allows for scripts and rules to be executed in a multitasking fashion. The shell is written in one of a number of high level languages to allow portability. Hardware specific software must only be written for the lowest level of the kernel which is the I/O drivers 800 shown in FIG. 8 representing the kernel architecture. I/O drivers 800 and I/O definition procedures 210 may be customized for a specific hardware platform. As is evident, the kernel may be designed to run on varieties of different platforms. The real time kernel as described herein 18 comprised of scheduler 12, command interpreter module 14, command processor 28, I/O formatter 24 and inference engine module 16. The real time kernel may be run on local work stations or on remote computers or combinations thereof. Physical interfaces may be abstracted from the kernel using I/O definition procedures 810 and by using this method of abstracting the hardware specifics, the identical kernel may be run on a variety of hardware platforms and customized for a variety of external process control applications.

Real time engine 100 as has been clearly shown in FIG. 1, has input data provided by data acquisition 56 and data reduction 58. Data acquisition 58 provides for decommutating bit streams into individual raw data items, filtering the incoming data items to check for a change against the data stored in the second storage area 20. Changed data is then passed to data reduction 58 for determination of significant changes. Data reduction 58 performs smoothing on data that has changed, stores data in second storage area 20 and notifies inference engine 16 on line 34 if the input signal has significantly changed as specified from the user defined record in area 20. Scheduler module 12 schedules immediate and delayed scripts 52 whereas inference engine 16 retrieves rules on agenda 54 that are triggered by changes in the database.

The script/rule development environment may be run on a number of platforms such as the Apple Macintosh and the development environment is ported to other work stations. One hardware configuration that is applicable and has been used successfully is the Macintosh II SE30 computer with 4M bytes of RAM and an 80M byte disc drive with a color or monochrome video monitor. Real time engine 100 may run locally on the Macintosh computer and has successfully been ported to run remotely with a number of machines such as the VAX family of computers running VMS. Scripts 52 and rules 54 that are to be executed by a remote real time engine 100 may be initially entered and compiled on a Macintosh computer based development environment and then may be downloaded to a remote computer that may be hosting the real time kernel.

Database records 802 as shown in the kernel architecture of FIG. 8 is provided and the database contains definitions of sensors, actuators, and derived data items that may be referenced by any instruction or data statements. In this manner, before an application may be compiled and run, some database is generated, compiled and loaded into the target remote computer system memory.

Further, as seen in FIG. 8, the overall kernel architecture is divided into two separate and distinct areas. The areas of the overall architecture include an applications specific area and an applications independent area. Applications specific areas include the input/output definition procedures 210, the database records 802 and the rules/scripts. The applications independent area includes the I/O manager 804, the database access routines 806 and interpreter 808. The database access routines 806 interface in a reversible manner with interpreter 808 and I/O manager 804 with the I/O manager 804 transferring and receiving data with interpreter 808 as well as I/O drivers 800 external to the overall architecture scheme. In this manner, there is provided an integrated database, which in previous prior art systems have been implemented, if ever, as separate command and telemetry, or input, databases, where command actuators, telemetry or other sensors and derived items therefrom are contained in and are defined in a single database.

The database contains different record types within database records 802 such as "telemetry sensors" for providing status information for particular pieces of external equipment necessary in a predetermined control function, Sensors may either be analog or discrete in nature where the analog sensors may be defined in database 802 along with associated coefficients which are used to convert the raw value returned by the sensor into an engineering value and allows raw units to be converted to some type of dimensional aspect parameter such as temperature, voltage, current or other values which may be displayed. Discrete sensors are defined with associated mnemonic states. Such mnemonic states are used to translate the value returned by the sensor into a mnemonic that is meaningful to the system user. Other database items include "command actuators" that cause an action to take place on the system being controlled. Such command actuators may be high level or low level discrete commands that are used to alter the state of relays or to synchronize digital logic or alternatively can be serial data word commands used to communicate commands to a processor based subsystem. "Derived items" are high level database records which are defined by the ultimate user to represent subsystem status, and other parameters such as average temperatures as well as intermediate results of calculations and are derived from the external system being controlled or from ground station datapoints and are calculated by agenda rules 54 and/or scripts 52 in order to monitor general subsystems on the external process control system.

The database includes a plurality of fields relating to record number, mnemonic name, description, subsystem, Database type, Data point type, state/coefficients, smoothing factor, sensitivity, IODEFID, rawValue (raw value), engValue (engineering value), smoothed (smoothed value), and alarmLevel. These fields are defined on a per record basis and are shown above for illustrative purposes.

Referring to "record number" each item in the overall database 802 is identified with a unique record number. The record number ranges from 1 to N where N is representative of the number of database records. The "mnemonic name" is the name used to refer to the record from scripts 52 and rules 54 and this field may contain an eight character mnemonic. The "description" field is a detailed definition of the mnemonic to assist users in identifying the item and is generally used on ground-based processing at the present time. The "subsystem" field is user defined and is used for sorting or cross-referencing. The "Database Type" field defines the type of sensor record where a "zero" provides for a discrete sensor record whereas a "one" may show an analog sensor. The "point type" field defines the function where a "zero" defines a sensor such as a status monitor, a "one" defines an actuator such as a command such as a relay driver, and, a "two" may define a derived item such as an artificial telemetry point. The "states/coefficients" field may be shared by both analog and discrete records. When the record is an analog, the engineering value may be computed from the raw value using a polynomial of the form:

$$engValue = C_0 + C_1*raw + C_2*raw + \ldots \quad (1)$$

Coefficients are entered in floating point format in sequential order:

$$C_0 <space> C_1 <space> C_2 \ldots \quad (1a)$$

For discrete records, the field may contain a numeric value reported by the sensor and an ASCII state which is associated with this value and has the format:

$$<value> space <state> space <value> space <state> \quad (2)$$

The "smoothing factor field" is used to smooth the incoming raw data before such is stored in the database. The smoothing algorithm computes an exponential average in order to filter out any spikes in the data:

$$smoothedValue = X*Value + (100-X)*old\ smoothed\ value \quad (3)$$

where: $X$ = smoothing factor in the range of 0–100%
The "sensitivity field" is used as a trigger to detect any changing data where a smoothed value for an item must change by plus or minus the sensitivity before the database is updated and inference engine 16 is notified. The "IODEFID field" specifies which input/output definition procedure is to be used to send a specified command. The "rawValue" (raw value) field contains the actual data value which is returned by some external sensor. The "engValue" (engineering value) field is the value of the database item subsequent to the applying of coefficients as described in the states/coefficients field and appears so that an initial value may be specified when the database is defined. The database record may be initialized with the value each time the database is loaded and is only used when the "DB type" or "Database type" field is an analog and this field may be left blank or set to a zero value.

The "smoothed" or "smoothed value" field is the value of the database item subsequent to using the smoothing algorithm as previously described in the "smoothing factor" field description. The smoothed field is used for analog sensor records. Interpreter 14 uses this value instead of the engineering value since it executes scripts 52 and evaluates rules from agenda 54. The "alarmLevel" (alarm level) field is used to indicate the alarm state of a database item. This can be input as an integer and may provide for normal, caution or warning conditions as well as other user defined integers to indicate an alarm state.

Inference engine 16 is the mechanism which responds to asynchronous events and consists of rules on the agenda 54, found in first storage system 18 and outputs to the interpreter 14. Interpreter 14 may be considered part of the inference engine in the broad concept. When the database record changes in second memory 20, specific rules relating to a particular record are retrieved from first memory 18 and placed on the agenda 54, then evaluated in priority order concurrently with scripts on the schedule list 52. Such an action may cause some generation of further reactions such as the setting of a database item like command actuators or derived items. An external user has control over inference engine 16 through command processor 28 on line 64 wherein inference engine 16 may be enabled/disabled as well as various strategies being changed. Rules from agendas 54 may be enabled/disabled on either an individual basis or in a group format as defined by category and subsystem fields. As has been described previously, inference engine 16 may be used for a plurality of purposes including implementation of control loops, monitoring process control data for changes and evaluation impact on subsystems; calculation of derived items indicating status of various subsystem elements; fault detection, isolation and recovery as well as command verification and constraint enforcement.

A rule within agenda 54 or a constraint is a simple conditional statement written using an "IF-THEN" structure. Obviously, as is well known, the left hand side of the rule or constraint contains the premises to be evaluated and if the premises evaluate to be true, the action defined by the right hand side of the equation is performed. Constraints and rules are generally similar in structure however the difference between a rule and a constraint is significant. Rule premises are evaluated when a database item referenced in the premise has changed. The right hand side of that rule is then executed subsequent to the database change occurring. However, constraint premises are evaluated prior to the database change or command taking place. Control signals that could be initiated as a result of the database change can then be inhibited.

The particular attributes of a rule or constraint are defined in the "header" field. The attributes are used by inference engine 16 to control the evaluation of a rule or a constraint. The "activation" field to be discussed in following paragraphs is modified dynamically while all other fields are defined during compilation. The rule and constraint keywords are used to specify the name of a rule or a constraint and may be up to thirty-two characters long.

The "subsystem" field is used as a user-defined field to further identify groups of rules or constraints. This may be used to cross-reference rules by particular subsystem and may be up to thirty-two characters long. The "category" field is also a user-defined field for identification of groups or rules or constraints. Oftentimes, the "category" field is used as a key for sorting the database and as in the case of the "subsystem" field, such is thirty-two characters long. The "priority" field is an integer number from having a designation within the range 0–31. In the priority numbers, larger numbers have higher priorities and the priority determines the order in which the rules will be fired. The "priority" field allows inference engine 16 to resolve any conflicts for execution based upon priority with the highest priority rules being executed first.

The "activation" field is used to enable/disable a rule on an individual basis. Activate/deactivate statements allow groups of rules to be activated or deactivated. The "category" keyword previously discussed allows the user to specify the activation state of all the rules within a specific category. Also, the "subsystem" keyword allows the user to specify the activation state of all the rules within some specific subsystem.

In overall operation, the inference engine 16 operates in a default mode so that a rules action is only performed when the rules premise is evaluated and is found to have changed from a "false" or "undetermined" to a "true". The "continuous" field is an optional rule attribute that is used to command inference engine 16 to perform the rules action every time its premise evaluates to a "true".

When agenda 54 inferencing strategy is enabled, constraints and rules are placed on a queue, or agenda 54 for processing. Agenda 54 is maintained in a priority order as has been previously discussed. By default, no duplicate rules or constraints are allowed to be placed on agenda 54. Each time a database event occurs, the rules associated with that event are retrieved and added in priority order to agenda 54. When rules and constraints are placed on agenda 54 they are evaluated at the next time slot available for agenda processing. Since the real time engine 100 supports multi-tasking, the constraints and rules will be worked from the agenda 54 either within the agenda quantum in parallel with executing scripts 52 or while no script execution is being performed.

The language provides a means for the user to define procedural command lists such as scripts, functions and rules. Compiled scripts, functions and rules are formed equivalent to code blocks that are stored in dynamically allocated memory and maintained by real time engine 100. Rules, scripts and functions may be dynamically added and deleted from the overall system 100.

The language grammar is composed of definition statement, operands, operators, functions and flow control statements. Scripts, rules, functions, global and local variables, and fields are named using 1–32 characters. Identifier names may include both upper and lower case characters with the valid identifier character names being: A–Z; a–z; 0–9; $; and an underscore mark. Literals may be written in the forms of decimal (integer, fixed point, and scientific notation), character string, hexadecimal, and octal. Code definition statements are used to identify the start of a script, rule or function. Scripts, functions and rules are blocks of executable codes stored in dynamically allocated memory.

Scripts are defined using script keyword and follows a specified convention. The script name must be specified and a script may optionally be passed from one to ten parameters. The common syntax for a script definition is as follows:

Syntax

```
script <name>[Parameter list]
    [global/local variable definitions]              (4)
    <statement(s)> ...
    [return]
end <name>
```

User-defined functions are scripts 52 which return a value. Function definitions conform to the same conventions as scripts 52 except that the "function" keyword is used and a single value is returned. The "return" statement is required in a function and the value return may be a variable or the result of an expression. Such user-defined functions have a syntax as follows:

Syntax:

```
function <name>[Parameter list]
    [global/local variable definitions]              (5)
    <statement(s)> ...
    return <expr>
end <name>
```

Rules are defined with the same basic syntax as scripts however they use a different header. The rule header defines the attributes of the rule and the attributes are used by inference engine 16 to control the evaluation of the particular rule. "Attribute" fields have been previously defined and the syntax is provided as an example as follows:

Syntax:

```
rule        <name>
subsystem   user_defined  --maximum 32 characters
category    user_defined  --maximum 32 characters
priority    <int>         --integer 0–31
activation  yes/no        --on/off evaluation
continuous  yes/no        --fire more than once per run?   (6)
if
    <expression>
then
```

```
        <statement> ...
        <statement> ...
    [else                    -optional else statement
        <statement> ... ]
    end if
end <name>
```

The language provides for a plurality of operands which may be used in expressions. The grammar provides for operand types as follows:

mnemonics for command actuators, sensors or derived items and are defined in the database and are global; parameter operand types are variables which are passed into a script or a function and are local in nature; global variables are variables which may be referenced by all scripts and rules and obviously are global in nature; database fields are predetermined database fields that can be manipulated by scripts and rules and are global in nature; bit fields are user-defined structures that specify bit fields within a 16-bit word however, once defined, the bit fields are global in scope; local variables are variables local to a particular script or rule and are local to that script or rule; arrays may be arrays of local or global variables within a script or rule and are local or global depending upon the manner in which they are defined; constants are fixed values which may be used in a script or function and are local to an entire source file such as constants which are visible to all scripts and rules within the source file; and, states which are values used to represent discrete states of a database item and are global in nature.

Referring now to mnemonics for commanding actuators, sensors or derived items, the user can manipulate items in the database by referencing a particular mnemonic. The mnemonic may appear as an operand in most expressions and may be associated with a "IF/THEN" type statement. Referring to parameter operands, scripts arid functions may be passed up to ten parameters however parameters may not be passed to rules. Parameters may be passed either by value or by reference and any parameters passed will be passed by value unless preceded by a "& sign" in which case the parameter will be passed by reference.

The operand type referring to global variables may be used to signal other scripts or rules that some event has taken place. The user is allowed to use a predetermined number of global variables within any particular project with any or all of them being referenced in a single script or rule.

Each script, function or rule that references a global variable must define it through the global statement before the variable is accessed. A reference to an item that is not in the database and is not defined as a global or field is assumed by the compiler to be a reference to a local variable. A rule may reference a global in its "then" block however, a global cannot be referenced in the conditional preface of a rule. To reference the global variable, such must be defined through the global statement within the action block of the rule. Global variables are always initialized to zero when inference engine 16 is initialized. One or more globals may be defined on a single global statement. If more than one global is defined, the variable names must be separated. More than one global statement may appear in a script or rule and the syntax may be as follows:

Syntax:

```
        script <name>[Parameter, ... ]
            global gVar1, gVar2                           (7)
            <statement> ...
        end <name>
```

Database fields which can be manipulated by scripts and rules as well as rule header fields are referenced by using a particular keyword in conjunction with the "of" keyword. System fields which may be used to access or alter attributes of database entry or rule header fields are provided as follows:

(1) database fields such as "alarmLevel"; "rawValue"; "engValue"; "slope"; "smoothedValue"; and, "smoothingFactor" as well as (2) rule header fields including activation and continuous with these fields being previously defined.

Bit fields are used to define fields within 16-bit integer words and once defined has the capability of simplifying the manipulation of bit fields within a serial command word. It is to be understood that fields are constructs which are not associated with any specific 16-bit word. The field definition is mapped onto the 16-bit word upon a reference. In this manner such allows the same field definition to be applied to a plurality of 16-bit words. The keyword "of" directs the computer language to map the field onto a variable. A user may define bit fields as is necessary for a particular project and field definitions are treated as global definitions where all scripts, functions and rules may use the definition. The field statement cannot appear within a script or function code block and fields must be defined external to the script and function code blocks which is evident as shown in the following syntax:

Syntax:
```
        field <name> <start bit> <number of bits>        (8)
```

Once the fields are defined they may be manipulated using computer. language keywords such as "set", "put", and "get", with the syntax of such commands being as follows for illustration purposes:

Syntax:
```
        set <fieldname> of <variable> to <value>         (9)
        put <fieldname> of <variable> into <variable>
        [get] <fieldname> of <variable>
```

Referring to local variables, such may be used in a script or rule and may be used for storing intermediate results and for other types of uses. Local variables may be explicitly declared by using the keyword "local" and may be created implicitly. A reference to any item that is not in the database and is not defined as a global or a field is assumed by the compiler to be a local variable. In such a case, the local variable has to be set to a value prior to being used. Two variables local to a current script are predefined by the computer language which are "result" and "it". The values of both "result" and "it" are set each time a system or database access function call is executed. The variable "result" receives the function calls status code whereas the variable "it" receives the functions returned value. The variables "result" and "it" may be used in expressions, for example, when a function is used to retrieve a value from the database, the value is returned in "it". The error code from the function is returned in "result", wherein the variable "result" will be set to the constant 0 if there is no error message for the function call.

The user is allowed to use both local and global variable arrays which may be declared explicitly using the "array" keyword or alternatively by using the "local" or "global" keywords. Constants may be defined as is necessary and are used to enhance the readability of scripts and rules. The scope of the constant is limited to the file wherein it is defined although such may be used in several scripts within the same file. Additionally, there is provided a "include" statement which allows the user to insert external text into the current script or function. The "include" statement is only valid at the beginning of a file and enables the user to predefine constants to be included in one or more files in a particular control system operation. If the "include" file is changed, all files which reference the "include" file must then be re-compiled.

The computer language defines operators to perform arithmetic, logical or unary operations where standard arithmetic operators are provided for add, subtract, multiply, divide, exponentiation and string concatenation. English equivalents are provided for these arithmetic operators. Logical operators such as greater than, greater than or equal, less than, less than or equal, equal, not equal, and, exclusive or are further provided in combination with unary operators such as logical not function and arithmetic negation.

Operators in an expression have precedence levels associated with each operator. Where parentheses do not explicitly indicate the grouping of operands within operators the operand may be grouped with either of two operators. In such cases, the grouping is determined by rules of precedence where the operator is grouped with the operator having higher precedence and operators of equal precedence are evaluated from a left to right basis. The operator precedence of the computer language as herein described is provided in FIG. 9 with the highest precedence being the parentheses and the lowest precedence being the logical XOR operator.

Some functions attuned to inference engine 16 include the "change" function which is used to signal inference engine 16 to check for any change of a database mnemonic. The "change" function is only valid in the "if" statement of a rule. The "reset" function is used to allow rules to be reset. By default, inference engine 16 will execute a rule once for a given run. However, the rule may be scheduled more than once due to the rule referencing more than one database item which has changed during the run. As previously described, the activate/deactivate statements modify the activation field of individual rules or groups of rules. The "category" keyword allows the user to specify a group of rules to be activated or deactivated based on the category field. The "subsystem" keyword allows the user to specify a group of rules to be activated or deactivated based upon the subsystem field.

Script scheduling is provided by "execute", "do", and "priority" keywords which allow varying types of script scheduling. Such types include execution of the script immediately or the script being executed at a specified date and time with the current date being assumed if the date is omitted and the keyword "at" identifies the absolute script 52. The date and time of execution may be specified in a predetermined format and if the execution time is specified using a variable, the variable must contain a time value that is expressed in "ticks" which is the finest unit of time supported by the computer language, as an example, on the Macintosh system, a tick can be equal to one-sixtieth of a second. Additionally, the script in normal operation can execute at a specified delta time from the current time. The keyword "in" identifies a time relative script. Scripts may also be scheduled for execution on a cyclic basis with the keyword "every" identifying a cyclic script. Schedule cyclic scripts may be provided which are similar to cyclic scripts except that the duration is specified using a "for" keyword and an execution time delay being specified using an "in" keyword. A "wait" statement suspends the execution of a script for some specified amount of time and may be specified in minutes/seconds/ticks or in a general time format.

Scripts may be synchronized in two modes, namely waiting for a script completion and a rendezvous at some particular event. In the waiting for a script completion, when a script is scheduled for execution from within another script, the main-level script will continue execution. Due to the fact that the application is multi-tasking, the scheduled script will run concurrently with the script that scheduled it. Such may be desirable for the main-level script to wait for completion of the script that it has scheduled. This provides a chance for the other computable scripts to run. An optional time-out can be added to the "waitfor" (wait for) statement if the "waitfor" statement times out, and a time-out error code will be returned in "result".

The language further provides a feature similar to an event flag with a time-out. This may be used in real time systems as a signal between processes. Scripts 52 can use this feature to signal other scripts that an event has occurred or that an event has not occurred within a specified time period. Scripts may signal one another using global variables or derived items. Scripts may also wait for a database item to be set due to another command being sent. Execution of a script 52 may be halted using the "stop" statement where the script is specified either by name or by ID.

Although this invention has been described in connection with specific forms and embodiments thereof, it will be appreciated that various modifications other than those discussed above may be resorted to without departing From the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A method of operating a computer system for producing process control signals to control an external process control system including the steps of:
   (a) providing first storage means for storing (1) prestored control parameters defining a plurality of instruction data scripts, and (2) predetermined process variables defining a plurality of process variable agenda;
   (b) establishing second storage means for receiving and storing specified input parameters from said external process control system;
   (c) establishing command processor means for accepting user input command signals and outputting processor control signals for execution at user determined time intervals;

(d) concurrently processing (1) said stored specified input parameters from said second storage means; (2) said pre-stored control parameters in a predetermined manner to provide a first command signal and (3) said predetermined process variables in a predetermined manner to provide a second command signal, said step of concurrently processing including the step of inserting said processor control signals to said concurrently processing pre-stored control parameters and said process variables, said step of processing said pre-stored control parameters further including the step of providing scheduling means coupled to said first storage means for prioritizing said pre-stored control parameters; and, (e) executing said first and second command signals for producing output control signals for control of said external process control system.

2. The method of operating a computer system as recited in claim 1 where the step of providing scheduling means includes the step of establishing a predetermined instruction data script having a predetermined priority rating value.

3. The method of operating a computer system as recited in claim 2 where the step of establishing a predetermined instruction data script includes the step of determining an instruction data script having a highest prestored priority rating value.

4. The method of operating a computer system as recited in claim 2 where the step of establishing a predetermined instruction data script includes the step of determining which of said instruction data scripts are applicable for control of said external process control system in a predetermined time interval.

5. The method of operating a computer system as recited in claim 2 where the step of establishing said predetermined instruction data script is followed by outputting said first command signal from said scheduling means for execution of said predetermined instruction data script.

6. The method of operating a computer system as recited in claim 5 where the step of establishing said second storage means includes the step of calculating variances of said specified input parameters input from said external process control system.

7. The method of operating a computer system as recited in claim 6 where the step of calculating variances of said specified input parameters includes the step of acquiring said specified input parameters from said external process control system and determining variance input parameter data.

8. The method of operating a computer system as recited in claim 7 where the step of storing specified input parameters is followed by the step of transferring said specified input parameter data boa comparison means for comparing said specified input parameters to said predetermined process variables stored in said first storage means.

9. The method of operating a computer system as recited in claim 8 where the step comparing includes the step of establishing a predetermined process variable agenda responsive to said comparison inputted specified input parameters.

10. The method of operating a computer system as recited in claim 9 where the step of establishing a predetermined process variable agenda is followed by determining a priority rating value for said process variable agenda.

11. The method of operating a computer system as recited in claim 10 where the step of determining a priority rating value for said process variable rule is followed by outputting said second command signal for execution of said process variable rule.

12. The method of operating a computer system as recited in claim 11 where the step of concurrently processing said pre-stored control parameters and said predetermined process variables is followed by the step of inserting said process variable agenda and said instruction data script into interpreter means for executing said command signals.

13. The method of operating a computer system as recited in claim 12 where said step of executing said command signals includes the step of executing input data in a priority manner where said input data having the highest priority value is executed initially.

14. The method of operating a computer system as recited in claim 13 where the step of priority execution of said data is followed by output of control signals for input to said external system.

15. The method of operating a computer system as recited in claim 1 where the step of inputting said processor control signals includes the step of externally controlling said first and second command signals.

16. A computer operated process control system for producing process control signals to control an external process control system comprising:

(a) first storage means for storing (1) pre-stored control parameters defining a plurality of instruction data scripts, and (2) predetermined process variables defining a plurality of process variable rules;

(b) second storage means for receiving and storing specified input parameters from said external process control system;

(c) command processor means for accepting user input command signals and outputting processor control signals;

(d) means for concurrently processing (1) said and (2) said pre-stored control parameters and said predetermined process variables in a predetermined manner for respectively providing first and second command signals, said means for concurrently processing said pre-stored control parameters includes scheduling means coupled to said first storage means for input thereto of said instruction data scripts;

(e) means for inserting said processor control signals to said concurrently processing pre-stored control parameters and said process variables; and, (f) means for executing said first and second command signals for producing output control signals for controlling parameters of said external process control system.

17. The computer operated process control system as recited in claim 16 where said scheduling means includes means for prioritizing said pre-stored control parameters for providing a predetermined instruction data script having a highest priority rating value.

18. The computer operated process control system as recited in claim 17 where said means for prioritizing includes means for determining said instruction data scripts which are executable during a predetermined time interval for control of said external process control system.

19. The computer operated process control system as recited in claim 18 where said first command signal is inserted to interpreter means for outputting said output control signals responsive to input of said first and second command signals, 20. The computer operated process control system as recited in claim 16 including means for acquiring input parameters from said external process control system for insert into said second storage means.

21. The computer operated process control system as recited in claim 20 including means for calculating variances of said specified input parameters being input from said external process control system.

22. The computer operated process control system as recited in claim 21 including comparison means for comparing said specified input parameters input from said second storage means and predetermined process variable scripts input from said first storage means.

23. The computer operated process control system as recited in claim 22 where said comparison means includes means for determining a predetermined process variable rule responsive to said comparison means inputted specified input parameters.

24. The computer operated process control system as recited in claim 23 where said means for executing said first and second command signals includes means for interpreting said first and second command signals for output of a predetermined output control signal for input to said external process control system.

* * * * *